US009390872B2

(12) United States Patent
Fanget

(10) Patent No.: US 9,390,872 B2
(45) Date of Patent: Jul. 12, 2016

(54) METHOD FOR CONTROLLING A CURRENT BREAKING DEVICE IN A HIGH-VOLTAGE ELECTRICITY NETWORK

(75) Inventor: Alain Fanget, Tramoyes (FR)

(73) Assignee: Alstom Technology Ltd, Baden (CH)

( * ) Notice: Subject to any disclaimer, the term of this patent is extended or adjusted under 35 U.S.C. 154(b) by 1063 days.

(21) Appl. No.: 13/516,214

(22) PCT Filed: Dec. 14, 2010

(86) PCT No.: PCT/EP2010/069568
§ 371 (c)(1), (2), (4) Date: Aug. 14, 2012

(87) PCT Pub. No.: WO2011/073163
PCT Pub. Date: Jun. 23, 2011

(65) Prior Publication Data

US 2012/0306290 A1 Dec. 6, 2012

(30) Foreign Application Priority Data

Dec. 15, 2009 (FR) ..................................... 09 58987

(51) Int. Cl.
*H02H 3/00* (2006.01)
*H01H 33/59* (2006.01)
*H01H 9/56* (2006.01)

(52) U.S. Cl.
CPC ............. *H01H 33/593* (2013.01); *H01H 9/563* (2013.01); *Y10T 307/944* (2015.04)

(58) Field of Classification Search
CPC .................................................... H01H 33/593
USPC ........................................................... 361/63
See application file for complete search history.

(56) References Cited

U.S. PATENT DOCUMENTS 3,704,392 A * 11/1972 Chen ...................... H02H 3/066 307/130
6,768,620 B2 * 7/2004 Kim ......................... H02H 3/06 361/59

(Continued)

FOREIGN PATENT DOCUMENTS

EP 1928007 A1 6/2008
EP 2 068 335 A1 6/2009

(Continued)

OTHER PUBLICATIONS

Search Report for French Patent Application No. 0958987 dated Jul. 28, 2010 by French Patent Office.

(Continued)

*Primary Examiner* — Stephen W Jackson
(74) *Attorney, Agent, or Firm* — Knobbe, Martens, Olson & Bear, LLP

(57) ABSTRACT

A method of controlling a current breaking device in a high-voltage electricity network is disclosed. In one aspect, the method includes, for each phase (A, B, C), obtaining missing supply voltages from an acquired supply voltage, performing healthy phase/faulty phase discrimination, conducting voltage analysis by attempted matching of a model over a signal window, choosing a strategy of simple closing or reclosing of the breaking device as a function of choice conditions, calculating a set of optimum reclosing times for each phase in accordance with the chosen strategy, and selecting an optimum time from the proposed optimum times and closing the phases of the current breaking device.

29 Claims, 5 Drawing Sheets

(56) References Cited

U.S. PATENT DOCUMENTS

| | | | |
|---|---|---|---|
| 2004/0189307 | A1 | 9/2004 | Rudholm et al. |
| 2005/0013080 | A1 | 1/2005 | Pilz et al. |
| 2009/0058573 | A1 | 3/2009 | Mori et al. |
| 2010/0200383 | A1 | 8/2010 | Saito |

FOREIGN PATENT DOCUMENTS

| | | | |
|---|---|---|---|
| WO | WO 03/050831 | A1 | 6/2003 |
| WO | WO 2006/043871 | A1 | 4/2006 |

OTHER PUBLICATIONS

International Search Report for International Patent Application No. PCT/EP2010/069568 dated Mar. 15, 2011 by European Patent Office.

Manoeuvres controlees, apercu de l'état de l'art (1st part) (Controlled operating, summary of the prior art ), Electra, No. 162, pp. 64-96, Oct. 1995.

Opposition against European Patent EP 2 513 935 B1 (application No. 10790957,4) dated Nov. 3, 2015, accompanied by Notification of Opposition dated Dec. 21, 2015 and Notification of Opposition dated Jan. 15, 2016.

Fröhlich et al., "Controlled Closing on Shunt Reactor Compensated Transmission Lines, Part I: Closing Control Device Development," *IEEE Transactions on Power Delivery*, vol. 12, No. 2, Apr. 1997, pp. 734-740.

Fröhlich et al., "Controlled Closing on Shunt Reactor Compensated Transmission Lines, Part II: Application nof Closing Control Device for High-Speed Autoreclosing on BC Hydro 500 kV Transmission Line," *IEEE Transactions on Power Delivery*, vol. 12, No. 2, Apr. 1997, pp. 741-746.

Fröhlich et al., "Controlled Switching of HVAC Circuit Breakers, Guide for Application Lines, Reactors, Capacitors, Transformers (1st Part)," *ÉLECTRA N° 183*, Apr. 1999, pp. 43-73.

Fröhlich et al., "Controlled Switching of HVAC Circuit Breakers, Guide for Application Lines, Reactors, Capacitors, Transformers (2nd Part)," *ÉLECTRA N° 185*, Aug. 1999, pp. 37-57.

CAT Controller Operating Instructions Version 5.01 © 2008, 1HC0056128 E01 /AB, ABB Switzerland Ltd, 8050 Zurich, Switzerland, pp. 1-127.

E-mail correspondence dated Jul. 15, 2015 between michael.stanek@ch.abb.com and eric.girardot@power.alstom.com, 2 pages.

* cited by examiner

METHOD FOR CONTROLLING A CURRENT BREAKING DEVICE IN A HIGH-VOLTAGE ELECTRICITY NETWORK

RELATED APPLICATIONS

This application is a U.S. National Phase of International Application No. PCT/EP2010/069568, filed Dec. 14, 2010, which is incorporated by reference in its entirety.

TECHNICAL FIELD

The invention relates to a method of controlling a current breaking device in a high-voltage electricity network.

Below, to simplify the description, a current breaking device of the circuit-breaker type and having the capacity to break a short-circuit current is considered.

BACKGROUND

The invention relates to a method of reducing voltage surges linked to the operation of a current breaking device in a high-voltage electricity network by determining optimum switching times for that device.

In the prior art, such control devices are designed to monitor the operating status of current breaking devices and to send early warnings, which is the best way to prevent network faults and to extend the service life of the device.

Prior art control devices incorporate new functions that render them "intelligent" through diagnosing not only the state of the parameters specific to the current breaking device but also the parameters of the network. They can thus issue local instructions to open or to close the electrical devices that they monitor.

Thus, as described in reference document [1] (see list at the end of the description), a plurality of circuit-breaker parameters are taken into consideration:

- stored energy (pressure, spring load, etc.);
- control voltages;
- arc extinction medium state and characteristics;
- ambient temperature;
- number of previous actuations;
- ageing effects;
- periods between actuations.

The influence of these parameters on the actuation time is strongly linked to the design of the circuit-breaker and must be evaluated for each application.

A plurality of network parameters can also be monitored to provide the control device with sufficient intelligence. Usually, the voltage on the supply side of the breaking device must be monitored. Sometimes the voltage on the load side of the breaking device and the current flowing through it must be monitored.

It must be remembered that the operation of high-voltage circuit-breakers, in particular line circuit-breakers, causes high transient inrush currents and voltage surges that make it obligatory to overspecify the electricity transport infrastructures: pylon dimensions, surge arrester size, etc. These voltage surges and inrush currents are an important constraining factor for high-voltage equipment, in particular transformers. Operating such a circuit-breaker at the optimum time relative to the voltage conditions existing at its terminals reduces these voltage surges and/or inrush currents. However, such a circuit-breaker has a long actuation time, i.e. the time between the time at which the close instruction is issued and the time at which the main contacts close, for example 50 milliseconds (ms). Although predicting an optimum actuation time is easy with purely sinusoidal signals (reactances, transformer's, capacitor banks), it is much less so in a "transmission line" application where the waveforms are complex and highly variable.

The field of application of the present invention is thus that of synchronous closing, otherwise known as point on wave (POW) switching, of high-voltage circuit-breakers enabling precise and reliable prediction of the optimum actuation times to limit oscillation phenomena on the high-voltage network liable to cause high voltage surges and to damage the electrical equipment, taking into account the problem of compensated or uncompensated lines.

The prior art devices include insertion resistances, as described in reference document [2]. These lead to a high overhead, however.

The object of the invention is to provide a method using a new control law to improve the prediction of the ideal time to close electrical current breaking devices in a high-voltage network.

SUMMARY OF CERTAIN INVENTIVE ASPECTS

The invention provides a method of controlling a current breaking device in a high-voltage electricity network typically comprising a generator, a power transformer, a three-phase current transformer, a supply-side single-phase voltage transformer, a line-side three-phase voltage transformer, a circuit-breaker and its control cabinet, and a transmission line, the method being characterized in that it comprises for each phase:

- a step of obtaining the missing supply voltages from the single acquired supply voltage;
- a step of healthy phase/faulty phase discrimination;
- a step of voltage analysis by attempted matching of a model over a signal window;
- a step of choosing a strategy of simple closing or reclosing of the breaking device as a function of choice conditions;
- a step of calculating a set of optimum reclosing times for each phase in accordance with the chosen strategy; and
- a step of selecting an optimum time from the proposed optimum times and closing the phases of the current breaking device.

The step of obtaining the supply voltage advantageously comprises:

- a step of acquiring a supply voltage corresponding to a phase; and
- a step of reconstituting the other two supply voltages corresponding to the other two phases by calculation.

The set of analog signals is advantageously sampled every 1 ms, even though the accuracy expected in the determination of the optimum actuation times by calculation is much less than 1 ms, typically 100 microseconds (μs).

The healthy phase/faulty phase discrimination is advantageously effected by continuously acquiring the currents and calculating, over a period of the power frequency, the root means square (RMS) value for each phase, which is stored in memory, and in the event of an open instruction the calculation of the RMS value in progress is terminated and that value is compared to the average of the n (for example 100) values stored in memory, and if this current value exceeds this average value by a value set by parameter(s) and the nominal value set by parameter(s) of the nominal current I divided by 10 then the phase is considered faulty.

If the open instruction occurs before the n RMS values have been stored in memory, then the healthy phase/faulty phase discrimination is advantageously carried out by calculating the current RMS value over the M=round(1/(f0*Ts)) points following the occurrence of the open instruction, a phase being considered faulty if the RMS current value exceeds the nominal current value assigned as a parameter allowing a margin of 25%.

The voltage analysis is advantageously effected by attempted matching over a signal window, typically of 100 ms, of a Prony model that is a sum of three damped sinusoids of amplitudes A', A'', and A''', with phases φ', φ'', and φ''', frequencies f', f'', and f''', and damping factors α', α'', and α''':

$$prony(t)=A'\cdot e^{\alpha'\cdot t}\cdot\cos(2\cdot\pi\cdot f't+\phi')+A''\cdot e^{\alpha''\cdot t}\cdot\cos(2\cdot\pi\cdot f''\cdot t+\phi'')+A'''\cdot e^{\alpha'''\cdot t}\cdot\cos(2\pi\cdot f'''\cdot t+\phi''')$$

the amplitudes A', A'', and A''' being classified in decreasing order to favor the highest amplitude mode, which is generally distinguished from the others A test comparing the time elapsed between the open instruction and the close instruction to a timeout t2 is advantageously used to distinguish between simple closing and rapid reclosing.

In the event of simple closing on reception of a close instruction, a line side and supply side voltage analysis is advantageously effected over the 100 ms of signal preceding the instruction and a strategy is chosen and after calculating a set of optimum times according to that strategy there follows a step of waiting for resynchronization of the phases.

In the event of rapid reclosing, if the current relative time is greater than a particular timeout t1, a line side voltage analysis is advantageously effected over the preceding 100 ms of signal and a strategy is chosen and after calculating a set of optimum times according to that strategy there follows a step of waiting for resynchronization of the phases.

This resynchronization step is advantageous in that it facilitates the use of a microprocessor-based machine for managing three real-time phases simultaneously, which authorizes the use of simple and economic electronics.

The resynchronization waiting step exit condition for phase A is advantageously as follows:

SC_x=copy of position of phase x of circuit-breaker, 1=closed, 0=open/CALC_x=global variable accessible in read mode, indicating by a value 1 that the phase x is from now in the waiting on resynchronization step, otherwise 0

SC_B=1 AND SC_C=1

OR

SC_B=0 AND CALC_B=1 AND SC_C=1

OR

SC_B=1 AND SC_C=0 AND CALC_C=1

OR

SC_B=01 AND CALC_B=1 AND SC_C=0 AND CALC_C=1

The conditions for choosing between the various strategies are advantageously as follows:

Cond1: (f' out of range OR A'<Amin) AND (f'' out of range OR A''<Amin) AND (f''' out of range OR A'''<Amin) AND healthy phase;

the "out of range" condition indicating that the frequency in question is not in the range [f1 f2] or f0*m*±1%, f1 and f2 being parameter frequencies of the application and f0*m* the measured power frequency, Cond2: (f'=f0*m*±1% AND A'>Amin AND A''<Amin), the values [A', A'', A'''] being assumed to be classified in decreasing order, f0*m* being the measured power frequency;

Cond3: (f1<f'<f2 AND A'>Amin AND A''<β*A');

Cond4: (A'>Amin AND A''>β*A');

Cond5: t0 not found OR line voltage decreases too fast after t0, t0 being the calculated line isolation time;

Cond6: Psupply<$Amin^2/2$ AND A'>Amin AND f'=f0±5%;

Amin being the minimum amplitude p.u. (per unit) below which an oscillatory mode is no longer considered significant (parameter);

Psupply being the power of the supply voltage signal, calculated over the same time window as the line side analysis, i.e. over N window points, samples Usupply[0] to Usupply [N−1] are available and:

$$Psupply=\frac{1}{N}*\sum_{i=0}^{N-1}Usupply(i)^2$$

the "slow decrease" criterion being such that it is the line voltage (Uline) that is processed, this criterion being satisfied if the M voltage points after t0 are all greater than or equal to a fraction set by parameter(s) of the voltage at t0 (M being the number of points corresponding to a period of the power frequency set by parameter(s)): [Uline(t0) . . . Uline (t0+M)]>=Uline(t0), the decrease being deemed too fast in the contrary situation; and β being the value between 0 and 1 set by parameter(s).

The simple closing and reclosing strategies are advantageously as follows:

Strategy 1: minimum or maximum supply voltage, considered sinusoidal at the power frequency, the optimum times being periodic with period 1/f0*m* (f0*m* is the measured power frequency);

Strategy 2: zero voltage at the terminals, considered sinusoidal at the power frequency, the optimum times being periodic with period 1/(2*f0*m*);

Strategy 3: local minima of beats in the voltage at the terminals, the optimum times being periodic with period 1/(f0*m*−f');

Strategy 4: zero voltage at the terminals, predicted by the complete Prony model, the optimum times not being periodic;

Strategies 5 and 7: zero supply voltage, considered sinusoidal at the power frequency, the optimum times being periodic with period 1/(2*f0*m*);

Strategy 6: angular closing set by parameter(s) on the line voltage, considered sinusoidal at the power frequency, the optimum times being periodic with period 1/f', the zero crossings being time-stamped and an angular offset being applied, which offset can be different from one phase to another.

The line isolation time t0 is advantageously determined by processing the line voltage signal in the forward direction from a time at which it is certain that the voltage seen from the measurement reducer is sinusoidal by searching for a break in the sinusoidal model over a sliding window of size M=round (1/(f0*Ts)) with an increment of one sample, f0 being the power frequency set by parameter(s), by attempting over each window of M points to fit a sinusoidal model by the non-linear least squares method, and using for each iteration a starting parameter vector that is defined as follows:

amplitude=maximum of window considered;

frequency=power frequency set by parameter(s);

phase=calculated as a function of the zero crossings in the window considered;

extrapolating, on each iteration, three future points using the estimated model and calculating the average of the three differences relative to the real signal, considering that detection of the time t0 is achieved if this average exceeds a particular threshold. This threshold can be set at 60% of the estimated amplitude of the model for the first window of the signal.

A stop is advantageously placed in the search for this time to materially represented by the fact of the following two conditions being satisfied:

timeout t1 elapsed; and close instruction received.

In strategy 1, the voltage at the terminals of the circuit-breaker being the supply voltage offset by a constant value, the sign of this constant value is advantageously determined by observing the algebraic value of the line voltage at the time t0; if this sign is positive, the closing is effected at a supply voltage maximum, and conversely if this sign is negative the closing is effected at a supply voltage minimum. Accordingly, the target time is the time of this maximum or minimum increased by the value:

$$\text{offset}=(\arccos(|U\text{line}(t0)|/A))/(2\cdot\Pi\cdot f0m)\ \text{if}\ |U\text{line}(t0)|<A;\ \text{or}$$

$$\text{offset}=0\ \text{if}\ |U\text{line}(t0)|>=A;$$

where:

A is the nominal phase-ground voltage value set by parameter(s);

f0$m$ is the measured power frequency;

Uline(t0) is the line voltage value at time t0; the extrema concerned are marked and time-stamped and a table of closing times that fall within the reclosing window [t3, t4] is proposed:

$$t_{opt}(k)=t_{extrema}k/f0m+\text{offset}$$

where k is a positive integer.

This calculated positive value may be limited by one eighth of the power frequency period set by parameter(s) [0.1/(8*f0)].

In strategy 2, the penultimate zero-crossing is advantageously marked and time-stamped accurately (by linear interpolation between samples) in the analysis window by linear interpolation between two samples of opposite sign and times are proposed that are multiples of the measured power period and fall within the reclosing window [t3, t4]:

$$t_{opt}(k)=t_{zero}k/(2*f0m)$$

where k is a positive integer.

In strategy 3, the periodic envelope of the voltage at the terminals of the circuit-breaker, which features beats, the envelope of which is to be reconstituted, which is periodic with period 1/(f0−f'), is advantageously reconstituted by closing on a local minimum of that envelope by choosing and time-stamping ($t_{beat}$) the local minimum closest to the center of the analysis window and proposing optimum reclosing times that fall within the reclosing window [t3, t4]:

$$t_{opt}(k)=t_{beat}+k/(f0m-f')$$

In strategy 4, only those zero-crossings of the voltage at the terminals of the circuit-breaker are advantageously retained that follow a "small amplitude" voltage lobe, with the following steps:

Prony analysis of the supply voltage over a window contemporary with the window of N points that is used for the preceding line side voltage analysis;

selection of the supply side dominant mode and the three line side modes to form a model of the voltage at the terminals of the circuit-breaker with four modes;

reconstitution of the waveform of the voltage at the terminal of the circuit-breaker in the reclosing window (t3, t4) according to the analytic form of the model:

$$\text{prony}(t)=A'\cdot e^{\alpha'\cdot t}\cdot\cos(2\cdot\pi\cdot f'\cdot t+\varphi')+A''\cdot e^{\alpha''\cdot t}\cdot\cos(2\cdot\pi\cdot f''\cdot t+\varphi'')+A'''\cdot e^{\alpha'''\cdot t}\cdot\cos(2\cdot\pi\cdot f'''\cdot t+\varphi''')+A'_s\cdot e^{\alpha'_s\cdot t}\cdot\cos(2\cdot\pi\cdot f'_s\cdot t+\varphi'_s)$$

the model being sampled at the same sampling frequency as the acquired data;

coarse marking of all the extrema in the window considered:

(prony[(k−1)Ts]<prony[kTs] AND prony[kTs]>prony[(k+1)Ts]) OR (prony[(k−1)Ts]>prony[kTs] AND prony[kTs]<prony[(k+1)Ts]): the time corresponding to the index k corresponds to an extremum;

selection of the 10% of the extrema or all of them, if the 10% of the total quantity is less than 10) for which the absolute value of the amplitude is the smallest;

fine estimation (by linear interpolation between samples) of the zero-crossing times following each extremum previously selected, these times therefore being returned.

In strategies 5 and 7, the penultimate zero-crossing "t0" of the supply voltage in the analysis window is marked by linear interpolation between two samples and times are proposed that are multiples of the measured power period that fall within the reclosing window [t3, t4]:

$$t_{opt}(k)=t_{zero}+k/(2*f0m)$$

where k is a positive integer.

In strategy 6, initially, the line voltage is advantageously low-pass filtered and a zero crossing is then searched for by linear interpolation between two samples corresponding to a positive dV/dt in the voltage table provided, nearest the middle of the window, and an angular offset is then applied corresponding to the value set by parameter(s) for the phase considered, taking into account the line frequency f' provided and times are then proposed that fall within the window [t3, t4], offset by a multiple of the period of the line voltage:

$$t_{opt}(k)=t_{offset}+k/f'$$

the proposed closing times being independent for each phase.

In the event of failure of the strategy chosen, an empty table is advantageously returned.

In the closing step common to the three phases, an optimum time is advantageously chosen for each phase to be reclosed from the set of times proposed according to a combination of two criteria: smallest spread of times, and times closest to the start of the reclosing window set by parameter(s). The triplet or pair can be selected for the minimum exponential of the difference between the two extreme times expressed in milliseconds multiplied by the distance at the time t3 expressed in seconds or at the first accessible time expressed in seconds. If only one phase is to be reclosed, the first accessible time is chosen.

If calculation errors occur in the strategy applications the following strategy is adopted:

three phases A, B, and C to be reclosed, one empty table: the two correct phases are closed successively, then the third phase is closed T0/2 after the last phase, T0 being the period 1/f0$m$ of the measured power frequency;

three phases A, B, and C to be reclosed, two empty tables: the correct phase is closed as soon as possible, the second phase T0/2 later, the third phase a further T0/2 later;

three phases A, B, and C to be reclosed, three empty tables: close at times (t3+t4)/2, (t3+t4)/2+T0/2, (t3+t4)/2+T0;

one phase to be reclosed, one empty table: close at time (t3+t4)/2.

The method of the invention thus proposes:

listing the optimum closing/reclosing strategies for all situations encountered in practice;

an algorithm enabling an unambiguous choice between these strategies;

a choice by estimating parameters of a sufficiently generic analytical model and by comparing parameters of this model to predetermined values.

The method of the invention therefore achieves the following advantageous results:

precisely targeting an optimum actuation point, knowing that the diversity of the situations encountered is high;

obtaining auto-adaptive behavior as imposed by the diversity of the situations encountered, knowing how to choose the correct actuation strategy as a function of the voltage conditions at the terminals of the circuit-breaker at the time it is to be actuated;

statistically minimizing recourse to a default strategy if it has not been possible to identify an appropriate strategy;

fast and accurate estimation of optimum actuation times (real-time aspect);

minimizing the spread between the three operating phases to be actuated (influence of the first phase that recloses on the closing conditions of subsequent phases).

The method of the invention also has the following advantages:

automatic choice of strategy: in particular, the control device knows in particular how to distinguish automatically between compensated lines and uncompensated lines;

accurate and fast method yielding a reliable choice between different closing strategies and reliable and accurate calculation of optimum closing times;

a solution of relatively low cost compared to a solution based on insertion resistances;

easy installation on existing circuit-breakers;

compatibility with voltage measurement reducers not passing DC (uncompensated capacitive dividers (CVT)), which constitute the majority of situations encountered in practice.

While the present invention is described herein in connection with certain embodiments, it is to be understood that the invention is not limited to the disclosed embodiments, but, on the contrary, is intended to cover various modifications and equivalent arrangements included within the spirit and scope of the appended claims, and equivalents thereof.

DETAILED DESCRIPTION OF CERTAIN EMBODIMENTS

Figure 1:
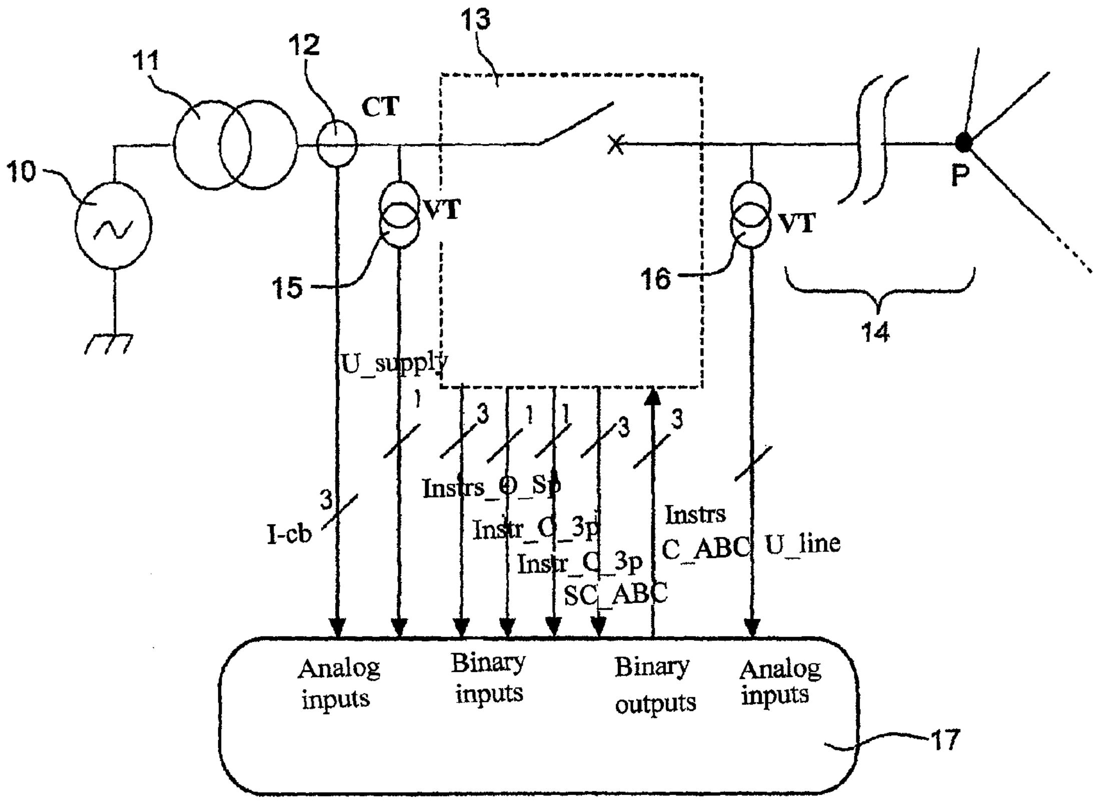
FIGS. 1 and 2 show a device for controlling a current breaking device in a high-voltage network using the method of the invention.
Figure 2:
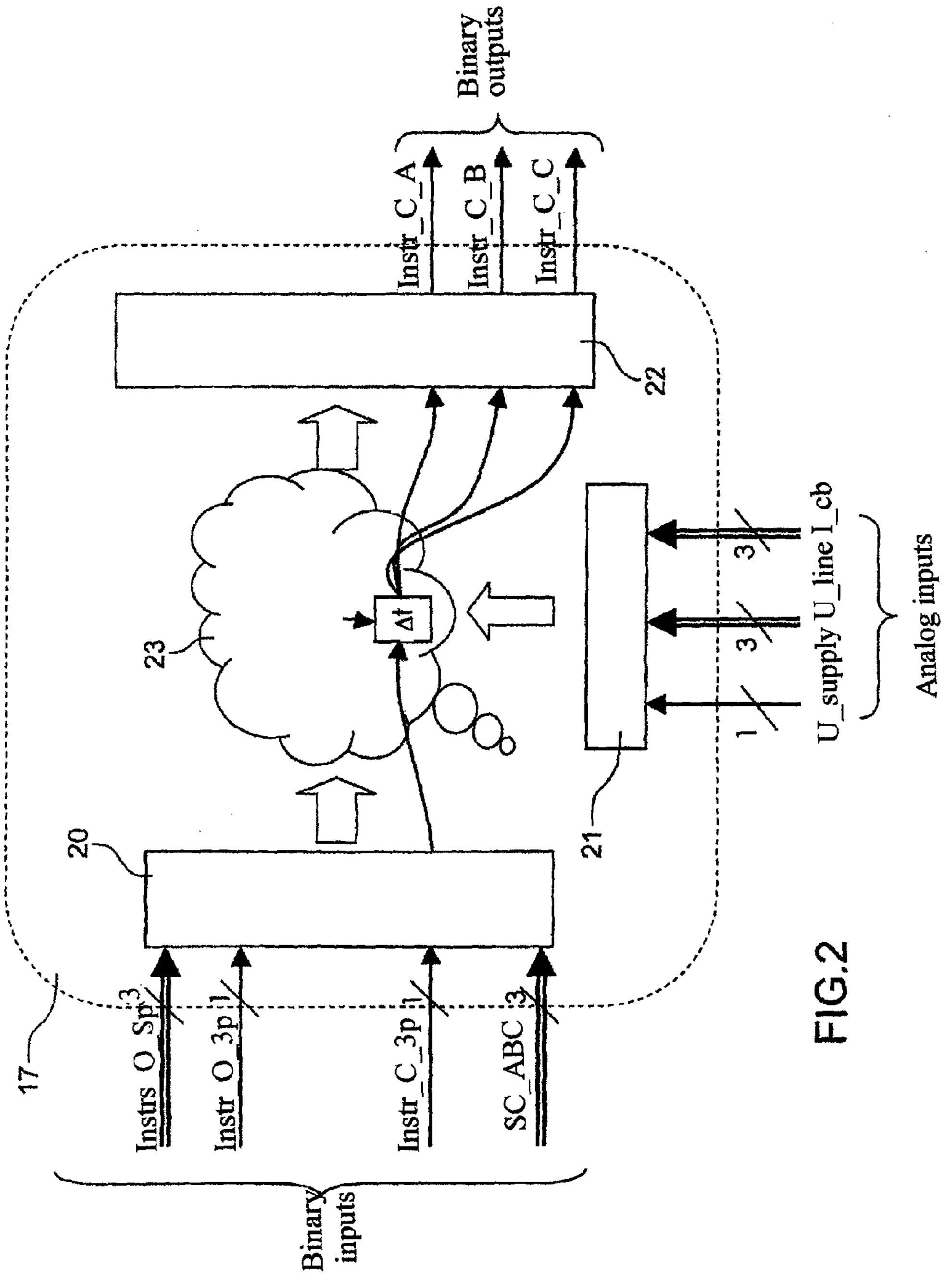

FIG. 1 shows a device for controlling a breaking device in a high-voltage network in which the method of the invention can be used. FIG. 2 is a diagram showing the internal functions of this device.

The following abbreviations are used in these figures:

VT: voltage transformer;

CT: current transformer;

BIN: binary (Boolean) information;

SC: secondary contact accessible to the user, copying the position of the high-voltage circuit-breaker, a "0" logic value indicating that the circuit-breaker is open and a "1" logic value indicating that the circuit-breaker is closed;

CALC_x (CALC_A, CALC_B, CALC_C): global variable; each state machine thus having access (in read-only mode) to the variable of the other phases; its function is to indicate (CALC_x=1) that the strategy calculation has been effected and that the state machine of the corresponding phase is awaiting synchronization.

The main user parameters of the control device are as follows:

f0: power frequency of the network;

f1, f2: lower and upper limit frequencies, between which the line into which the circuit-breaker is inserted is considered compensated and the phase is considered healthy (fault-free), typical values being: f1=20 Hz, f2=0.9*f0;

Amin: minimum amplitude p.u. (per unit) below which an oscillatory mode is no longer considered significant;

t1: time from which a reclosing procedure can be started: t1=reclosing_window_start−mechanical_closing_time−calculation_time;

t2: time beyond which it is considered that simple closing then applies (no reclosing instruction has been received);

[t3, t4]: target reclosing window;

SC timeouts;

angles for closing of each phase PhA, PhB, PhC;

β, value between 0 and 1, limit fraction of main mode for considering a secondary mode significant (default value: 0.5).

Figure 5:
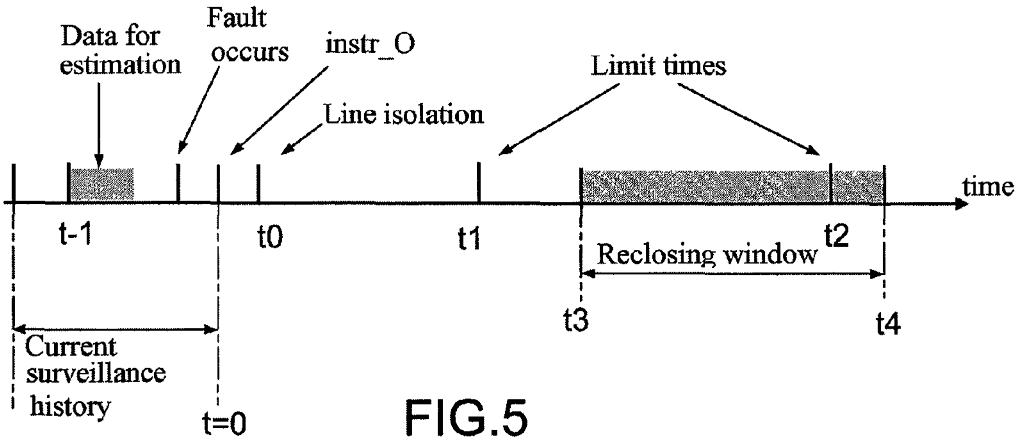
FIGS. 5 and 6 show timing diagrams for the operation of the control device using the method of the invention.

The times t1 and t2 run from the time of receiving the open instruction (instr_0), as shown in FIG. 5.

FIG. 1 shows an electrical circuit comprising in succession between ground and a point P connected to the high-voltage electricity network:

a generator 10;

a power transformer 11;

a current transformer 12;

a circuit-breaker and its control cabinet 13;

a transmission line 14.

The control device 17 receives the following signals from this electrical circuit:

analog inputs from the current transformer 12 (circuit-breaker current I_cb), the input (supply voltage U_supply) and the output (line voltage U_line) of the circuit-breaker and the control cabinet 13 via voltage transformers 15 and 16;

BIN (binary) inputs (three single-phase open instructions instrs_O_sp, an instruction common to the three phases instr_O_3*p*, a closing instruction common to the three phases instr_C_3*p*, and three SC_ABC indicating the position of the circuit-breaker); and BIN outputs (three individual instructions instr_C_ABC).

As shown in FIG. 2, this control device includes:

a digital acquisition module 20 receiving the BIN inputs;

an analog acquisition module 21 receiving the analog inputs;

a digital output module 22 delivering the BIN outputs: individual closing instruction for each phase A, B, C;

a real-time algorithm module 23 between the input and output modules 20, 21, and 22.

For reasons of economy, only one supply voltage is acquired (phase A): the other two (phases B and C) are reconstituted by calculation: filtering, phase-shifting by k*120° taking into account which of the voltages was acquired. Phase-shifting is effected by linear interpolation at the time (delay/advance) corresponding to the phase-shift (measured power frequency "f0*m*"). There is no necessity for better interpolation (polynomial or cardinal sine, with the attendant higher computation cost) because only the zero-crossings of this supply voltage, in which area the linear approximation is very good, are relevant.

Figure 3:
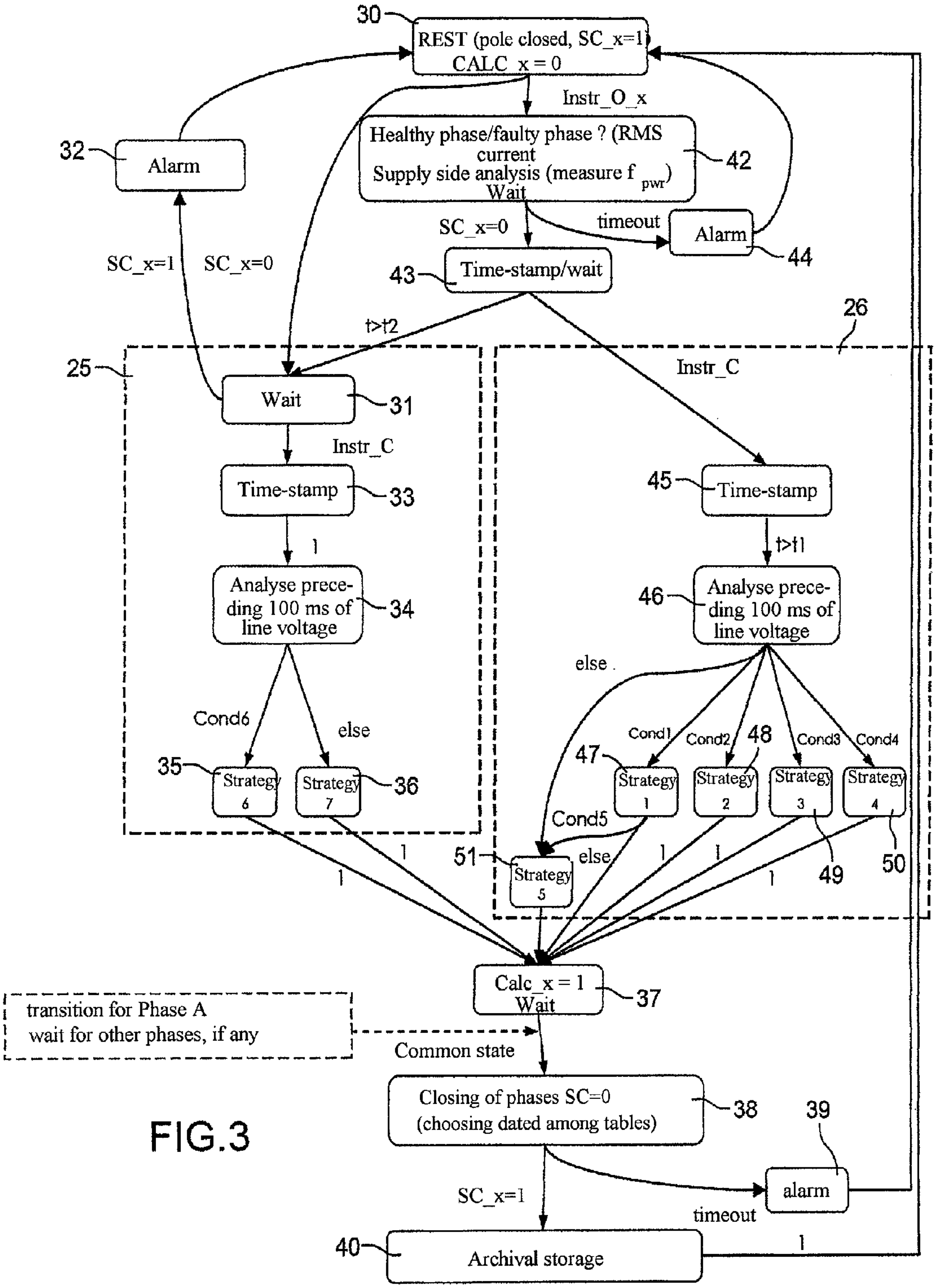
FIG. 3 shows a state machine and the steps of the method of the invention for one phase of the network.

The general control algorithm for closing the circuit-breaker (to allow current to flow) is represented in FIG. 3, showing the steps of the method of the invention, in the form of a state machine (state-transition automaton) corresponding to one phase. In this figure, the "1" digits indicate an unconditional transition on leaving a state: the transition takes place as soon as processing of the state has been completed. Thus three state machines are executed in parallel for a three-phase circuit-breaker, each responsible for one phase A, B or C. Thus for the phase "x" x=A, B or C.

The noteworthy points of this algorithm are as follows:

- a timeout t2 for differentiating simple closing from rapid reclosing (elapsed time between open instruction and close instruction);
- a timeout t1, which is a parameter enabling the user not to reclose the circuit-breaker too promptly even if the reclosing instruction arrives promptly;
- possible separation of simple closing/fast reclosing and healthy phase/faulty phase situations, enabling discrimination between trapped charge (fast reclosing cycle, healthy phase, uncompensated line) and line powering (simple closing, line voltage not significant), the voltage measurement reducers (VT) generally not providing DC voltage information: a null voltage signal on the line side after opening (when there is no current flowing) may correspond to a trapped charge and thus to a DC voltage on the line which, in the worst case scenario, is equal to the nominal phase-ground peak voltage. There would then be an ambiguity. Choosing the correct strategy is therefore based on the history of events.

The method of the invention distinguishes between two situations, simple closing cycle (25) and fast reclosing cycle (26):

1) Simple Closing Cycle (25)

On powering up, the algorithm (or state machine) is in the rest state 30, corresponding to a circuit-breaker closed state. If the circuit-breaker is already open (SC_x=0), a waiting state 31 follows on directly. This state is left if the SC changes (SC_x=1), in which case an alarm 32 is raised (operation without instruction) and there is a return to the rest state 30. This state is also left in the event of receiving a close instruction instr_C. In this case, the instruction is time-stamped (33) and a line side and supply side voltage analysis (34) is started, for example on the preceding 100 ms of signal. Depending on the results of this analysis 34 (see condition 6) a choice is made to apply strategy 6 (35) or strategy 7 (36). This applies for the time necessary for calculating a set of optimum times in the target closing window.

At the end of this time, there is an automatic switch to a waiting state 37 ("possible wait for other phases") in which resynchronization with the other phases to be reclosed is necessary. The exit condition for this state is given below for the phase A:

SC_B=1 AND SC_C=1
OR
SC_B=0 AND CALC_B=1 AND SC_C=1
OR
SC_B=1 AND SC_C=0 AND CALC_C=1
OR
SC_B=01 AND CALC_B=1 AND SC_C=0 AND CALC_C=1

Once this synchronization has been achieved, an optimum time is chosen for the phases to be reclosed (SC_x=0) from among those proposed and the phases are closed (38) taking into account the mechanical time necessary for the circuit-breaker to close.

The return to the rest state is effected after verifying switching of the SC (SC_x=1), indicating that the phase is actually closed, and after archival storage of the sequence (40). If an SC switching timeout is reached, an alarm 39 is raised and there is a return to the rest state.

2) Fast Reclosing Cycle (26)

The rest state 30 can be left by receiving an open instruction (instr_O_x). After time stamping the open instruction, whether the phase is open following a fault is determined (42) by observing the current and the power frequency f0*m* of the network is measured by analyzing the supply voltage before opening. There is then a wait (43).

This wait ends when the SC changes state (SC_x=0), indicating actual opening of the circuit-breaker. If an SC change of state timeout is reached, there is a return to the rest state and an alarm is set (44). The change of state of the SC is then time-stamped and the wait resumes.

If a timeout t2 (set by a parameter) is exceeded there is a return to the simple close situation described above.

If a close instruction (instr_C) arrives before the timeout t2 has expired, there is a change to the rapid reclosing cycle. The arrival of the close instruction is then time-stamped (45) and a wait begins. If the current relative time exceeds the timeout t1 (a parameter set by the user), a line side voltage analysis is launched (46).

The choice is made to apply one of the strategies 1, 2, 3, 4 or 5 (47-51), depending on the results of this analysis (see conditions 1 to 5). In strategy 1, an additional verification of the opportunity of applying this strategy is effected: if the condition is not satisfied, there is a change (51) to the strategy 5. This lasts the time necessary to calculate a set of optimum times in the target closing window.

At the end of this calculation time, there is an automatic change (37) to a waiting state ("possible wait for other phases") or it is necessary to resynchronize with the other phases to be reclosed. The exit condition for this state is the same as that stated above for the simple closing cycle.

The end of the algorithm (38) is common to the two cycles 25 and 26 and is as described above.

FIG. 5 is a timing diagram for the operation of the device implementing the method of the invention in the event of rapid reclosing. This figure shows the history of surveillance of the currents before t=0 (opening instruction) and the reclosing window between times t3 and t4.

Figure 6:
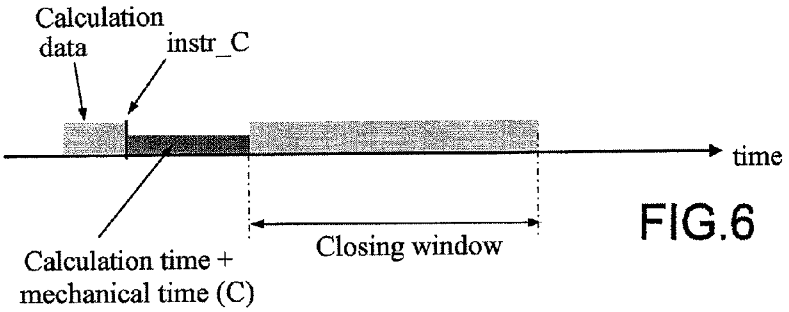

FIG. 6 is a timing diagram for the operation of the device implementing the method of the invention in the event of simple closing. This figure shows the closing window between times t3 and t4.

The modules shown in FIG. 3 and characteristics of the method of the invention are analyzed below.

A) Healthy Phase/Faulty Phase Discrimination (42)

The currents flowing through the circuit-breaker in the "rest" state are observed continuously so as to have a sufficiently long history before the open instruction, which is the first event of which the control device is aware. The control device continuously acquires these currents and calculates the root mean square (RMS) value for each phase over one period of the power frequency, which value is stored in memory. The most recent of these values, for example the last 100 values, are retained in a “history” circular buffer. As soon as an open instruction “instr_O” is received, the calculation of the RMS value in progress is terminated. If this value exceeds by X % (X is a parameter with a default value of 20%) the average of the 100 values stored in memory, and $I_{nominal}/10$ (parameters), then the phase concerned is considered faulty. A Boolean indicator is then set to “1” for later use. This indicator is reset to “0” during the next closing operation.

The set of parameters includes three magnitudes: percentage overshoot, number of RMS values stored, fault consideration threshold. The above arbitrary figure of 100 values stored in memory goes back beyond the time of occurrence of the fault and can thus be adjusted case by case (the timeout of the protection device that issues the close instruction is not known).

If the history is insufficient (because the device has just been powered up), the discrimination criterion is different degraded operation) if the open instruction occurs when the 100 RMS values have not been calculated: the history is discarded and the current RMS value calculated over the M=round(1/(f0*Ts)) points following the occurrence of the open instruction (round=rounding to the nearest integer). A phase is considered faulty if the current RMS value exceeds the nominal current value assigned as a parameter, allowing a 25% margin.

The Boolean indicator is updated in the same way.

B) Voltage Analysis (34 or 36)

The voltage analysis is effected by attempting to match a Prony model with twelve parameters over a signal window typically of 100 ms. The sampling period is typically 1 ms. This models a sum of three damped sinusoids (called “modes”) of amplitudes A', A'', and A''', phases φ', φ'', and φ''', frequencies f', f'', and f''', and damping factors α', α'', and α'''. Thus:

$$\text{prony}(t)=A'\cdot e^{\alpha'\cdot t}\cdot\cos(2\cdot\pi\cdot f't+\phi')+A''\cdot e^{\alpha''\cdot t}\cdot\cos(2\cdot\pi\cdot f''\cdot t+\phi'')+A'''\cdot e^{\alpha'''\cdot t}\cdot\cos(2\pi\cdot f'''\cdot t+\phi''')$$

The amplitudes A', A'', and A''' are classified in decreasing order to favor the mode of greatest amplitude, which is generally distinguished from the others.

One method that would suggest itself to the person skilled in the art for estimating these twelve parameters optimally is the non-linear least squares method, or any other method of minimizing the root mean square error between the model and the experimental data.

C) Simple Closing and Reclosing Strategies (35-36, 47-51)

1. List of Strategies

The simple closing and reclosing (rapid reclosing cycle) strategies are as follows (the optimum closing points are indicated):

- Strategy 1: supply voltage minimum or maximum, considered sinusoidal at the power frequency, the optimum times being periodic with period 1/f0*m* (f0*m* is the measured power frequency);
- Strategy 2: zero voltage at the terminals of the circuit-breaker, considered sinusoidal at the power frequency, the optimum times being periodic with period 1/(2*f0*m*);
- Strategy 3: local minima of beats in the voltage at the terminals of the circuit-breaker, the optimum times being periodic with period 1/(f0*m*−f');
- Strategy 4: zero voltage at the terminals of the circuit-breaker, predicted by the complete Prony model, the optimum times not being periodic;
- Strategies 5 and 7: zero supply voltage, considered sinusoidal at the power frequency, the optimum times being periodic with period 1/(2*f0*m*);
- Strategy 6: angular closing (parameters set by line voltage), considered sinusoidal at the power frequency, the optimum times being periodic with period 1/f', the zero crossings being time-stamped and an angular offset that can differ from one phase to another being applied.

2. Strategy Choice Conditions

These conditions are as follows, the values A', A'', A''' being classified in decreasing order:

Cond1: (f' out of range OR A'<Amin) AND (f'' out of range OR A''<Amin) AND (f'' out of range OR A'''<Amin) AND healthy phase.

The “out of range” condition indicates that the frequency in question is not in the range [f1 f2] or f0*m*±1%, f1 and f2 being frequencies that are parameters of the application and f0*m* being the measured power frequency. The line side produces no oscillation and a trapped charge is suspected because the phase in question is healthy.

Cond2: (f'=f0*m*±1% AND A'>Amin AND A''<Amin).

The circuit-breaker at the other end of the line has already reclosed, the line is at the power frequency, and the voltage at the terminals is possibly sinusoidal because of the possible phase-shift between the supply and line voltages.

Cond3: (f1<f'<f2 AND A'>Amin AND A''<β*A').

The line oscillates in a unique mode. Significant beating between the line voltage and the supply voltage is present. The optimum times are local minima of the envelope of the voltage at the terminals.

Cond4: (A'>Amin AND A''>β*A').

There are at least two oscillatory modes on the line side, the optimum times are not periodic, and predicting the voltage at the terminals must be based on the complete model. The optimum times are the zero-crossings of the voltage at the terminals.

Cond5: t0 not found OR line voltage decreases too fast after t0;

Cond6: Psupply<Amin$^2$/2 AND A'>Amin AND f'=f0±5%.

The power Psupply of the supply side signal does not exceed the threshold Amin$^2$/2 indicating a significant mode and the greatest line side amplitude A' is significant (implicitly the only significant mode). The frequency associated with this line side significant mode f' is of the same order of magnitude as the power frequency f0 set by the parameter(s).

Note that:

Psupply is the power of the supply voltage signal calculated over the same time window as the line side analysis, i.e. samples Usupply[0] to Usupply[N−1] are available over N window points and:

$$Psupply=\frac{1}{N}*\sum_{i=0}^{N-1}Usupply(i)^2$$

The “slow decrease” criterion, which is such that it is the line voltage Uline that is processed, is satisfied if the M voltage points after t0 are all greater than or equal to a fraction set by parameter(s) of the voltage at t0 (M being the number of points corresponding to a period of the power frequency set by parameter(s)): [Uline (t0) . . . Uline (t0+M)]>=Uline (t0). In the contrary situation, with the decrease deemed too fast, it is estimated that there is no trapped charge (constant residual voltage in an isolated line) and the "zero supply" reclosing criterion of strategy 5 is applied.

Figure 4:
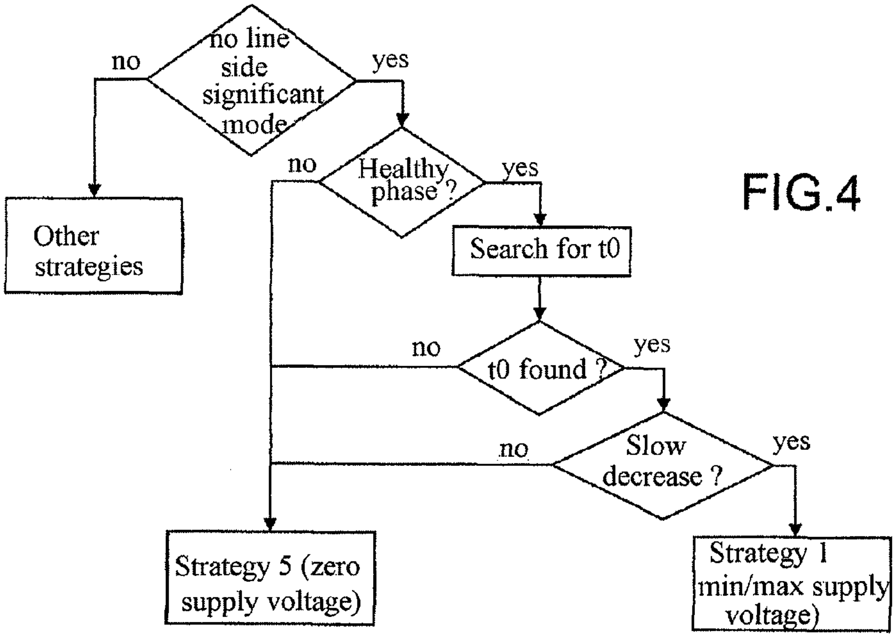
FIG. 4 shows the selection of a supply min/max strategy.

The min/max supply strategy is therefore selected after the process shown in FIG. 4.

FIG. 4 shows are in succession:

a test 50 to determine whether there is no line side significant mode;

a test 51 to determine whether the phase considered is healthy;

a search 52 for the time t0;

a test 53 to determine whether this time has been found;

a test 54 to determine whether there is a slow decrease, which leads to choosing:

strategy 5 (55) in the event of a positive result of the test 50 and a negative result of the tests 51, 53, and 54; or strategy 1 (56) in the contrary situation; or the other strategies (57) in the event of a negative result of the test 50.

3. Determination of the Line Isolation Time (T0)

It is necessary to determine this isolation time of the line t0, which corresponds to opening of the two circuit-breakers situated at the two ends thereof, if strategy 1 (supply voltage min or max) is applied. It is whichever of the two circuit-breakers situated at the two ends of the line that opens last, and therefore isolates the line, that defines the trapped charge and the time at which the line is isolated if the line is not compensated. This determination is based on the line voltage: the time at which the voltage is extinguished is determined using a measurement reducer that does not pass DC. This time is not very distinctive as there is a transient of exp(−t/Tau) type on which angular frequencies caused by the influence of the other two phases can be superimposed. To this end, the line voltage signal is taken into account at successive times in the increasing time direction (forward direction) from a time at which it is certain that the voltage seen by the measurement reducer is sinusoidal (i.e. the time of arrival of the open instruction): a sinusoidal model break search is effected over a sliding window of size M=round(1/(f0*Ts)) with an increment of one sample, f0 being the power frequency set by the parameter(s). Fitting a sinusoidal model with three parameters (amplitude, angular frequency, phase: "$A\cdot\cos(\omega\cdot t+\phi)$") by the non-linear least squares method is attempted over each window of M points. Each iteration uses a start parameter vector defined as follows:

amplitude=maximum of the window considered;

frequency=power frequency set by parameter(s);

phase=calculated as a function of zero-crossings in window considered.

On each iteration, three future points are extrapolated with the aid of the estimated model and the average of the three differences relative to the real signal is calculated. If this average exceeds a particular threshold, it is considered that t0 has been detected. For example, this threshold is set at 60% of the estimated amplitude of the model for the first signal window (first iteration). The estimated time t0 is then one sampling step before detection.

A stop is placed in the search for this time t0 (in case detection is never achieved). In this situation, the time t0 is considered "not found". This stop is materialized by the fact of the following two conditions being satisfied:

timeout t1 elapsed; and instr_C received.

4. Detailed Description of Strategies

1) Strategy 1: Supply Voltage Minimum or Maximum

The voltage at the terminals of the circuit-breaker is thus the supply voltage, sinusoidal at the power frequency f0, offset by a constant value (on the timescale of the rapid reclosing cycle). The sign of this constant value must be determined by determining the algebraic value of the line voltage at time t0. If this sign is positive, closing is effected at a supply voltage maximum, and conversely if this sign is negative closing is effected at a supply voltage minimum. Accordingly, the target time is the time of this maximum or minimum increased (shifted "rightward" toward higher times) by the value:

$$\text{offset}=(\arccos(|U\text{line}(t0)|/A))/(2\cdot\Pi\cdot f0m)\ \text{if}\ |U\text{line}(t0)|<A;\ \text{or}$$

$$\text{offset}=0\ \text{if}\ |U\text{line}(t0)|>=A;$$

where:

A is the nominal phase-ground voltage value set by the parameter(s);

f0*m* is the measured power frequency;

Uline(t0) is the line voltage value at time t0.

This calculated positive value is limited by one eighth of the power frequency period set by the parameter(s), [0.1/(8*f0)].

Over the supply voltage window considered for the analysis, the algorithm thus marks and time-stamps the extrema (minimum or maximum) concerned and proposes a table of closing times that fall within the reclosing window [t3, t4]:

$$t_{opt}(k)=t_{extrema}+k/f0m+\text{offset}$$

where k is a positive integer.

In the event of failure of the function (i.e. if no extrema are identified), the table returned is empty.

2) Strategy 2: Zero Voltage at Terminals Considered Sinusoidal at Power Frequency Over the window of the (differential) voltage at the terminals considered for the analysis, the penultimate zero-crossing is marked (accurately, by linear interpolation) and times are proposed that are multiples of the measured power period that fall within the reclosing window [t3, t4]:

$$t_{opt}(k)=t_{zero}+k/(2*f0m)$$

where k is a positive integer.

In the event of failure of the function (i.e. if no zero is identified), the table returned is empty.

3) Strategy 3: Local Minima of Beats

It is the (differential) voltage at the terminals of the circuit-breaker that is processed. In the situation of a compensated line and a healthy phase, or a fault that has cleared, this voltage features beats, periodic with period 1/(f0−f') and the envelope of which is to be reconstituted. The criterion is to close on a local minimum of this envelope. A better way is to search for and target the real zero-crossing of the voltage at the terminals nearest the relative minimum of the envelope that has been detected.

The following analytical calculation steps effect this reconstitution by means of two amplitude demodulations (cos and sin) effected in parallel, supply/line phase-shift estimation, and finally the "modulating" (envelope) function:

"carrier" frequency such that: Fc=(f0+f')/2;

cosine demodulation: signal(t)*cos(2*pi*Fc*t);

sine demodulation: signal(t)*sin(2*pi*Fc*t);

low-pass filtering of the signals at the cut-off frequency Fc to eliminate the high-frequency component (using a "zero delay" filter to circumvent delay problems):

$$\text{Sig\_demod\_cos}=\text{filter\_}zd[\text{signal}(t)*\cos(2*\text{pi}*Fc*t)]$$

$$\text{Sig\_demod\_sin}=\text{filter\_}zd[\text{signal}(t)*\sin(2*\text{pi}*Fc*t)]$$

supply/line angular phase-shift estimation, using the function "a tan2":

Phi(*t*)=2**a* tan2(sig_demod_cos(*t*),sig_demod_sin(*t*))

obtaining the required envelope:

Envelope(*t*)=2*[sig_demod_cos(*t*)·*sin(phi(*t*)/2)+ sig_demod_sin(*t*)·*cos(phi(*t*)/2)]

The minima of this envelope correspond to local minima of the beats. They are therefore time-stamped precisely. One of several (tbeat) is chosen in the analysis window and optimum reclosing times proposed that fall in the reclosing window [t3, t4]:

$$t_{opt}(k)=t_{beat}k/f0m-f')$$

4) Strategy 4: Zero Voltage at the Terminals Using the Complete Prony Model

It is the (differential) voltage at the terminals of the circuit-breaker that is processed. This is the most difficult strategy: the waveform identified on the line side cannot be approximated (for example by a sinusoid): the complete model (frequencies, amplitudes, phases, damping) is required to predict the waveform at the terminals of the circuit-breaker in the reclosing window (there is therefore an analytical form of the voltage) and to select the zero-crossing times on the model. In order to reduce the potential pre-arc time (the dielectric strength of the circuit-breaker is not infinite), only the zero-crossings are retained that follow a "small-amplitude" voltage lobe (according to a criterion explained below).

The following steps are therefore executed:

Prony analysis of the supply voltage over a window contemporary with the 100 ms window that is used for the preceding line side voltage analysis;

selection of the dominant supply side mode and the three line side modes to form a model of the voltage at the terminals of the circuit-breaker with four modes;

reconstitution of the waveform in the reclosing window (t3, t4) according to the analytic form of the model:

$$\text{prony}(t) = A'\cdot e^{\alpha'\cdot t}\cdot\cos(2\cdot\pi\cdot f'\cdot t+\varphi')+A''\cdot e^{\alpha''\cdot t}\cdot\cos(2\cdot\pi\cdot f''\cdot t+\varphi'')+ A'''\cdot e^{\alpha'''\cdot t}\cdot\cos(2\cdot\pi\cdot f'''\cdot t+\varphi''')+A'_s\cdot e^{\alpha' s\cdot t}\cdot\cos(2\cdot\pi\cdot f'_s\cdot t+\varphi'_s)$$

the model being sampled at the same sampling frequency as the acquired data;

coarse marking of all the extrema in the window considered:

(prony[(k−1)Ts]<prony[kTs] AND prony[kTs]>prony [(k+1)Ts]) or (prony[(k−1)Ts]>prony[kTs] AND prony [kTs]<prony[(k+1)Ts]): the time corresponding to the index k corresponds to an extremum, Ts being the sampling period;

selection of 10% of the extrema (or all of them if the 10% of the total quantity is less than 10) for which the absolute value of the amplitude is the smallest;

fine estimation (by linear interpolation between two samples of opposite sign) of the zero-crossing times following each extremum previously selected, these times therefore being returned.

In the event of failure (i.e. if no zero is identified), the table returned is empty.

5) Strategies 5 and 7: Zero Supply Voltage

Over the supply voltage window considered for the analysis, the penultimate zero-crossing "t0" is marked (accurately, by linear interpolation) and times are proposed that are multiples of the measured power period and fall within the reclosing window [t3, t4]:

$$t_{opt}(k)=t_{zero}+k/(2*f0m)$$

where k is a positive integer

In the event of failure (i.e. if no zero is identified), the table returned is empty.

6) Strategy 6: Closing on Angular Parameters, on Line Voltage

It is the line voltage considered sinusoidal at the power frequency f0 that is processed.

Initially, the line voltage is low-pass filtered using the filter of the supply voltage reconstitution function. A zero-crossing is then searched for corresponding to a positive dV/dt in the voltage table provided, nearest the middle of the window. An angular offset is then applied corresponding to the value set by the parameter(s) for the phase considered, taking into account the line frequency f' provided (obtaining a later time $t_{offset}$). Times are then proposed that fall within the window [t3, t4] offset by a multiple of the period of the line voltage:

$$t_{opt}(k)=t_{offset}+k/f'$$

Figure 7:
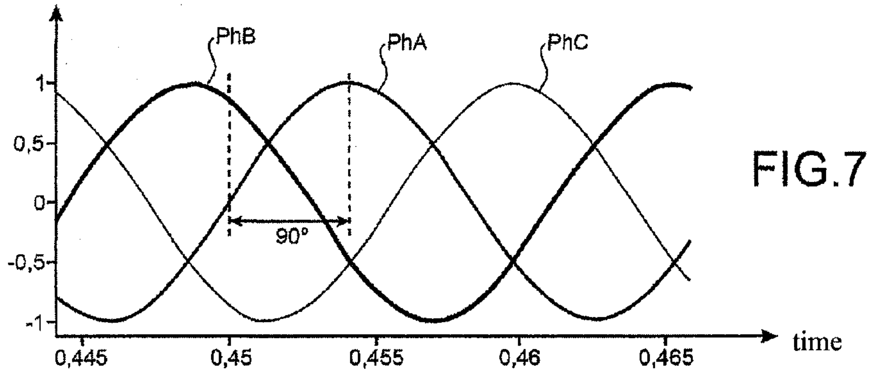
FIGS. 7 and 8 respectively show angular offset and transformer off-load closings with isolated neutral.

The closing times proposed in this way are independent for each phase. There is therefore an angular offset closing as shown in FIG. 7.

In the time choice function (state 38 in FIG. 3), closing is attempted with the nearest times for the three phases to impose a closing sequence with certitude. Thus only zeros with positive dV/dt are retained in order to space and to reduce the grouping possibilities and thus to avoid a non-optimum closing sequence.

Figure 8:
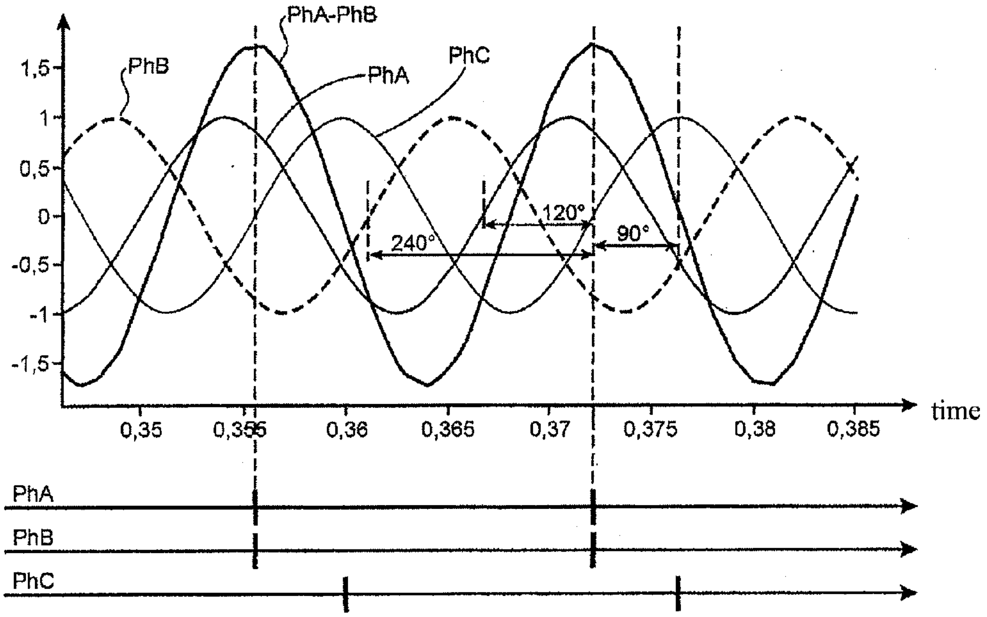

FIG. 8 shows the parameter values [PhA, PhB, PhC]=[120°, 240°, 90°] typically corresponding to transformer no load closing in an isolated neutral network (for illustration purposes, the difference between PhA and PhB is shown in addition to the three phases). Here the strategy is to close the first two phases simultaneously on a maximum of their differential voltage and then the third phase a quarter-period (90°) later. It is seen that the proposed closing times are grouped naturally, imposing the closing sequence PhA+PhB then PhC.

D) Closing Common to the Three Phases (37-38)

In the FIG. 3 state machine, each strategy unfolds as quickly as possible given the onboard calculation power and produces as output a set (table) of optimum closing times (parameters) in the target closing window.

The next step 38 in the algorithm, which is common to the three phases A, B, and C (and therefore to the three state machines), chooses an optimum time for each phase to be closed. This optimum combines two criteria: lowest spread of the times (so as to minimize the change in operating conditions brought about by the first phase that closes on the subsequent ones) and times as close as possible to the beginning of the reclosing window (the prediction becoming progressively less accurate on moving away from the analysis window).

The triplet (or pair) is selected for which the exponential of the difference between the extreme times, expressed in milliseconds, multiplied by the distance at the time t3 (the smallest value of t3 of the three phases for reclosing) or at the first accessible time (for simple reclosing) of the average (central) time of this triplet (or pair), times expressed in seconds, is at a minimum. The three times of this triplet (or pair) must be accessible at the time this analysis is effected (it is not too late to generate this instruction, given the actuation time, the mechanical time of the circuit-breaker).

If only one phase is to be reclosed, the spread criterion does not apply and the first accessible time is chosen (given the mechanical time of the circuit-breaker).

If calculation errors occur in the strategy applications (one of more tables returns empty), the following strategy is adopted:

- three phases A, B, and C to be reclosed, an empty table: the two correct phases are closed according to the above criterion; the third phase is then closed T0/2 after the last phase where T0 is the period 1/f0*m* of the measured power frequency;
- three phases A, B, and C to be reclosed, two empty tables: the correct phase is closed as soon as possible, the second phase T0/2 later, the third phase a further T0/2 later;
- three phases A, B, and C to be reclosed, three empty tables: close at times (t3+t4)/2, (t3+t4)/2+T0/2, (t3+t4)/2+T0;
- one phase to be reclosed, one empty table: close at time (t3+t4)/2.

REFERENCES

[1] "Manoeuvres contrônées, aperçu de l'état de l'art (1st part)" (Electra, No. 162, October 1995).

[2] US 2004/0189307.

What is claimed is:

1. A method of controlling a current breaking device in a high-voltage electricity network comprising a generator, a power transformer, a three-phase current transformer, a supply-side single-phase voltage transformer, a line-side three-phase voltage transformer, a circuit-breaker and its control cabinet, and a transmission line, the method comprising for each phase:

- obtaining missing supply voltages from an acquired supply voltage;
- performing healthy phase/faulty phase discrimination;
- conducting voltage analysis by attempted matching of a model over a signal window;
- choosing a strategy of simple closing or reclosing of the breaking device as a function of choice conditions;
- calculating a set of optimum reclosing times for each phase in accordance with the chosen strategy;
- selecting an optimum time from the proposed optimum reclosing times; and
- closing phases of the current breaking device.

2. A method according to claim 1, wherein obtaining the supply voltage comprises:

- acquiring a supply voltage corresponding to a phase; and
- reconstituting other two supply voltages corresponding to other two phases by calculation.

3. A method according to claim 1, wherein the healthy phase/faulty phase discrimination comprises:

- continuously acquiring currents;
- calculating, over a period of a power frequency, a root means square (RMS) value for each phase and storing the RMS value in memory,
- in the event of an open instruction, terminating the calculation of the RMS value in progress and comparing the RMS value to an average of <u>n</u> values stored in memory, and
- if the RMS current value exceeds the average by a value set by parameter(s) and a nominal value I set by parameter(s) of a nominal current I divided by 10 then the phase is considered faulty.

4. A method according to claim 3, wherein n=100.

5. A method according to claim 3, wherein, if the open instruction occurs before the <u>n</u> RMS values have been stored in memory, then the healthy phase/faulty phase discrimination is carried out by calculating the current RMS value over the M=round(1/(f0*Ts)) points following the occurrence of the open instruction, a phase being considered faulty if the RMS current value exceeds the nominal current value assigned as a parameter allowing a margin of 25%.

6. A method according to claim 1, wherein the voltage analysis is effected by attempted matching over a signal window of a Prony model (t) that is a sum of three damped sinusoids of amplitudes A', A'', and A''', with phases φ', φ'', and φ''', frequencies f', f'', and f''', and damping factors α', α'', and α''':

$$prony(t)=A'\cdot e^{\alpha'\cdot t}\cdot\cos(2\cdot\pi\cdot f'\cdot t+\phi')+A''\cdot e^{\alpha''\cdot t}\cdot\cos(2\cdot\pi\cdot f''\cdot t+\phi'')+A'''\cdot e^{\alpha'''\cdot t}\cdot\cos(2\pi\cdot f'''\cdot t+\phi''')$$

the amplitudes A', A'', and A''' being classified in decreasing order to favor the highest amplitude mode.

7. A method according to claim 1, wherein a test comparing the time elapsed between an open instruction and a close instruction to a timeout t2 is used to distinguish between simple closing and rapid reclosing.

8. A method according to claim 7, wherein in the event of simple closing on reception of a close instruction, a line side and supply side voltage analysis is effected over an 100 ms signal preceding the instruction and a strategy is chosen and after calculating a set of optimum times according to the strategy there follows a waiting time for resynchronization of the phases.

9. A method according to claim 7, wherein in the event of rapid reclosing, if a current relative time is greater than a particular timeout t1, a line side voltage analysis is effected over a signal in the preceding 100 ms and a strategy is chosen and after calculating a set of optimum times according to that strategy there follows waiting for resynchronization of the phases.

10. A method according to claim 8, wherein the resynchronization waiting time exit condition for phase A is as follows:

SC_x=copy of position of phase <u>x</u> of circuit-breaker, 1=closed, 0=open/CALC_x=global variable accessible in read mode, indicating by a value 1 that the phase <u>x</u> is from now in the waiting on resynchronization step, otherwise 0

SC_B=1 AND SC_C=1

OR

SC_B=0 AND CALC_B=1 AND SC_C=1

OR

SC_B=1 AND SC_C=0 AND CALC_C=1

OR

SC_B=01 AND CALC_B=1 AND SC_C=0 AND CALC_C=1.

11. A method according to claim 6, wherein the conditions for choosing between the various strategies are as follows:

Cond1: (f' out of range OR A'<Amin) AND (f'' out of range OR A''<Amin) AND (f''' out of range OR A'''<Amin) AND healthy phase;

the "out of range" condition indicating that the frequency in question is not in the range [f1 f2] or f0*m*±1%, f1 and f2 being parameter frequencies of the application and f0*m* the measured power frequency, Cond2: (f'=f0*m*±1% AND A'>Amin AND A''<Amin);

Cond3: (f1<f'<f2 AND A'>Amin AND A''<β*A');

Cond4: (A'>Amin AND A''>β*A');

Cond5: t0 not found OR line voltage decreases too fast after t0, t0 being the calculated line isolation time;

Cond6: $Psupply<Amin^2/2$ AND A'>Amin AND f'=f0*m*±5%;

Amin being the minimum amplitude per unit below which an oscillatory mode is no longer considered significant; Psupply being the power of the supply voltage signal, calculated over the same time window as the line side analysis, over N window points, samples Usupply[0] to Usupply [N−1] are available and:

$$Psupply = \frac{1}{N} * \sum_{i=0}^{N-1} Usupply(i)^2$$

the "slow decrease" criterion being such that it is the line voltage (Uline) that is processed, this criterion being satisfied if the M voltage points after t0 are all greater than or equal to a fraction set by parameter(s) of the voltage at t0 (M being the number of points corresponding to a period of the power frequency set by parameter(s)): [Uline (t0) . . . Uline (t0+M)]>=Uline (t0), the decrease being deemed too fast in the contrary situation; and β being a value between 0 and 1 set by parameter(s).

12. A method according to claim 10, wherein the simple closing and reclosing strategies are as follows:

Strategy 1: minimum or maximum supply voltage, considered sinusoidal at the power frequency, the optimum times being periodic with period 1/f0*m* (f0*m*: measured power frequency);

Strategy 2: zero voltage at the terminals, considered sinusoidal at the power frequency, the optimum times being periodic with period 1/(2*f0*m*);

Strategy 3: local minima of beats in the voltage at the terminals, the optimum times being periodic with period 1/(f0*m*−f');

Strategy 4: zero voltage at the terminals, predicted by the complete Prony model, the optimum times not being periodic;

Strategies 5 and 7: zero supply voltage, considered sinusoidal at the power frequency, the optimum times being periodic with period 1/(2*f0*m*);

Strategy 6: angular closing on the line voltage set by parameter(s), considered sinusoidal at the power frequency, the optimum times being periodic with period 1/f', the zero crossings being time-stamped and an angular offset being applied, which offset can be different from one phase to another.

13. A method according to claim 12, wherein the line isolation time t0 is determined by processing the line voltage signal in the forward direction from a time at which it is certain that the voltage seen from the measurement reducer is sinusoidal by searching for a break in the sinusoidal model over a sliding window of size M=round(1/(f0*Ts)) with an increment of one sample, f0 being the power frequency set by the parameter(s), by attempting over each window of M points to fit a sinusoidal model by the non-linear least squares method, and using for each iteration a starting parameter vector that is defined as follows:

amplitude=maximum of window considered;

frequency=power frequency set by parameter(s);

phase=calculated as a function of the zero crossings in the window considered; and extrapolating, on each iteration, three future points using the estimated model and calculating the average of the three differences relative to the real signal, considering that detection of the time t0 is achieved if this average exceeds a particular threshold.

14. A method according to claim 13, wherein the threshold is set at 60% of the estimated amplitude of the model for the first window of the signal.

15. A method according to claim 13, wherein a stop is placed in the search for this time t0 materially to indicate that the following two conditions are satisfied:

timeout t1 elapsed; and close instruction received.

16. A method according to claim 13, wherein, in strategy 1, the voltage at the terminals of the circuit-breaker being the supply voltage offset by a constant value, the sign of this constant value is determined by observing the algebraic value of the line voltage at the time t0; if this sign is positive closing is effected at a supply voltage maximum and conversely if this sign is negative closing is effected at a supply voltage minimum, the target time being the time of this maximum or minimum increased by the value:

$$\text{offset}=(\arccos(|Uline(t0)|/A))/(2\cdot\Pi\cdot f0m) \text{ if } |Uline(t0)|<A; \text{ or}$$

$$\text{offset}=0 \text{ if } |Uline(t0)|>=A;$$

where:

A is the nominal phase-ground voltage value set by parameter(s);

f0*m* is the measured power frequency;

Uline(t0) is the line voltage value at time t0;

the extrema concerned are marked and time-stamped and a table of closing times that fall within the reclosing window [t3, t4] is proposed:

$$t_{opt}(k)=t_{extrema}+k/f0m+\text{offset}$$

where k is a positive integer.

17. A method according to claim 16, wherein the extrema concerned are a minimum or a maximum.

18. A method according to claim 16, wherein the calculated value of the offset is limited by one eighth of the period of the power frequency set by parameter(s) [0.1/ . . . (8*f0)].

19. A method according to claim 13, wherein, in strategy 2, the penultimate zero-crossing is marked and time-stamped accurately in the analysis window by linear interpolation between two samples of opposite sign and times are proposed that are multiples of the measured power period and fall within the reclosing window [t3, t4]:

$$t_{opt}(k)=t_{zero}+k/(2*f0m)$$

where k is a positive integer.

20. A method according to claim 13, wherein in strategy 3, the periodic envelope of the voltage at the terminals of the circuit-breaker, which features beats, the envelope of which is to be reconstituted, which is periodic with period 1/(f0−f'), is reconstituted by closing on a local minimum of that envelope by choosing and time-stamping the local minimum closest to the center of the analysis window and proposing optimum reclosing times that fall within the reclosing window [t3, t4]: $t_{opt}(k)=t_{beat}+k/(f0m-f')$.

21. A method according to claim 13, wherein, in strategy 4, only those zero-crossings of the voltage at the terminals of the circuit-breaker are retained that follow a "small amplitude" voltage lobe with the following:

conducting Prony analysis of the supply voltage over a window contemporary with the window of N points (100 ms) that is used for the preceding line side voltage analysis;

selection the supply side dominant mode and the three line side modes, to form a model of the voltage at the terminals of the circuit-breaker, with four modes;

reconstituting the waveform of the voltage at the terminal of the circuit-breaker in the reclosing window (t3, t4) according to the analytic form of the model:

$$\text{prony}(t) = A' \cdot e^{\alpha' \cdot t} \cdot \cos(2 \cdot \pi \cdot f' \cdot t + \varphi') + A'' \cdot e^{\alpha'' \cdot t} \cdot \cos(2 \cdot \pi \cdot f'' \cdot t + \varphi'') + A''' \cdot e^{\alpha''' \cdot t} \cdot \cos(2 \cdot \pi \cdot f''' \cdot t + \varphi''') + A'_s \cdot e^{\alpha'_s \cdot t} \cdot \cos(2 \cdot \pi \cdot f'_s \cdot t + \varphi'_s)$$

the model being sampled at the same sampling frequency as the acquired data;

conducting coarse marking of all the extrema in the window considered:

(prony[(k−1)Ts]<prony[kTs] AND prony[kTs]>prony[(k+1)Ts]) or (prony[(k−1)Ts]>prony[kTs] AND prony[kTs]<prony[(k+1)Ts]): the time corresponding to the index k corresponds to an extremum;

selecting the 10% of the extrema, or all of them if the 10% of the total quantity is less than 10, for which the absolute value of the amplitude is the smallest;

conducting fine estimation by linear interpolation between two samples of opposite sign of the zero-crossing times following each extremum previously selected, these times therefore being returned.

22. A method according to claim 13, wherein, in strategies 5 and 7, the penultimate zero-crossing "t0" of the supply voltage in the analysis window is marked accurately by linear interpolation between two samples and times are proposed that are multiples of the measured power period that fall within the reclosing window [t3, t4]:

$$t_{opt}(k)=t_{zero}+k/(2*f0m)$$

where k is a positive integer).

23. A method according to claim 10, wherein, in strategy 6, initially, the line voltage is low-pass filtered, a zero crossing is then marked accurately by linear interpolation between two samples, corresponding to a positive dV/dt in the voltage table provided, nearest the middle of the window, and angular offset is then applied corresponding to the value set by parameter(s) for the phase considered, taking into account the line frequency f' provided, and times are then proposed that fall within the window [t3, t4], offset by a multiple of the period of the line voltage:

$$t_{opt}(k)=t_{offset}+k/f'$$

the proposed closing times being independent for each phase.

24. A method according to claim 16, further comprising: in the event of failure of the strategy chosen, returning an empty table.

25. A method according to claim 1, further comprising: in the closing process common to the three phases, choosing an optimum time for each phase to be reclosed from the set of times proposed according to a combination of two criteria: smallest spread of times, and times closest to the start of the reclosing window set by parameter(s).

26. A method according to claim 24, further comprising selecting the triplet or pair for the minimum exponential of the difference between the two extreme times expressed in milliseconds multiplied by the distance at the time t3 expressed in seconds or at the first accessible time expressed in seconds.

27. A method according to claim 24, further comprising: if only one phase is to be reclosed, choosing the first accessible time.

28. A method according to claim 24, further comprising: if calculation errors occur in the strategy applications, adopting the following strategy:

if there are three phases A, B, and C to be reclosed and one empty table, closing the two correct phases successively, and then closing the third phase T0/2 after the last phase, T0 being the period 1/f0*m* of the measured power frequency;

if there are three phases A, B, and C to be reclosed and two empty tables, closing the correct phase as soon as possible, closing the second phase T0/2 later, and closing the third phase a further T0/2 later;

if there are three phases A, B, and C to be reclosed and three empty tables, closing the phases at times (t3+t4)/2, (t3+t4)/2+T0/2, (t3+t4)/2+T0;

if there are one phase to be reclosed and one empty table, closing the phase at time (t3+t4)/2.

29. A method according to claim 1, wherein the analog signals are sampled every 1 ms although the required accuracy for the optimum times is much less being in the order of about 100 μs.

* * * * *